United States Patent [19]

Price-Falcon

[11] Patent Number: 4,674,534
[45] Date of Patent: Jun. 23, 1987

[54] PARTICULATE SOLIDS FLOW CONTROL VALVE

[75] Inventor: J. Federico Price-Falcon, Nuevo Leon, Mexico

[73] Assignee: Hylsa, S.A., Monterrey, Mexico

[21] Appl. No.: 875,627

[22] Filed: Jun. 18, 1986

[51] Int. Cl.⁴ .............................................. F16K 5/00
[52] U.S. Cl. .................................... 137/613; 251/310; 251/304; 222/554
[58] Field of Search ....................... 251/304, 309, 310; 137/613, 614.12, 614.13, 637.3; 222/545, 554

[56] References Cited

U.S. PATENT DOCUMENTS

| | | | |
|---|---|---|---|
| 102,745 | 5/1870 | Young | 137/614.13 X |
| 862,741 | 8/1907 | Kieren | 251/310 |
| 897,009 | 8/1908 | Powell . | |
| 1,566,605 | 12/1925 | Jamison . | |
| 2,084,248 | 6/1937 | Ferrari et al. . | |
| 2,494,091 | 1/1950 | Harris . | |
| 2,703,654 | 3/1955 | Overton | 137/613 |
| 2,712,454 | 7/1955 | Love . | |
| 2,718,339 | 9/1955 | Pankratz . | |
| 3,123,334 | 3/1964 | Hitz . | |
| 3,233,757 | 2/1966 | Long . | |
| 3,275,025 | 9/1966 | Kowalski . | |
| 3,710,808 | 1/1973 | Celada et al. . | |
| 4,037,820 | 7/1977 | Lowe . | |
| 4,130,268 | 12/1978 | Kojima et al. . | |
| 4,276,905 | 7/1981 | Lourdeaux . | |
| 4,473,175 | 9/1984 | Zengaffinen . | |
| 4,514,129 | 4/1985 | Legille et al. | 222/545 X |

FOREIGN PATENT DOCUMENTS 1025224 2/1958 Fed. Rep. of Germany .

Primary Examiner—A. Michael Chambers
Assistant Examiner—John C. Fox
Attorney, Agent, or Firm—A. Thomas; S. Safford

[57] ABSTRACT

A valve for controlling the flow of particulate solid material, especially a hot, friable, granular material. The valve comprises a fixed vertical feed tube and a concavo-convex valve member mounted for rotation about an axis forming an obtuse angle with the axis of the feed tube. The rotatable valve member is positioned so that its dished inner surface confronts the lower end of the feed tube and is essentially perpendicular thereto to block flow of material through the valve when it is in its closed position. The rotatable member has one or more openings therein that can be positioned in registry with the bottom of the feed tube to open the valve and permit the solid material to flow therethrough.

9 Claims, 5 Drawing Figures

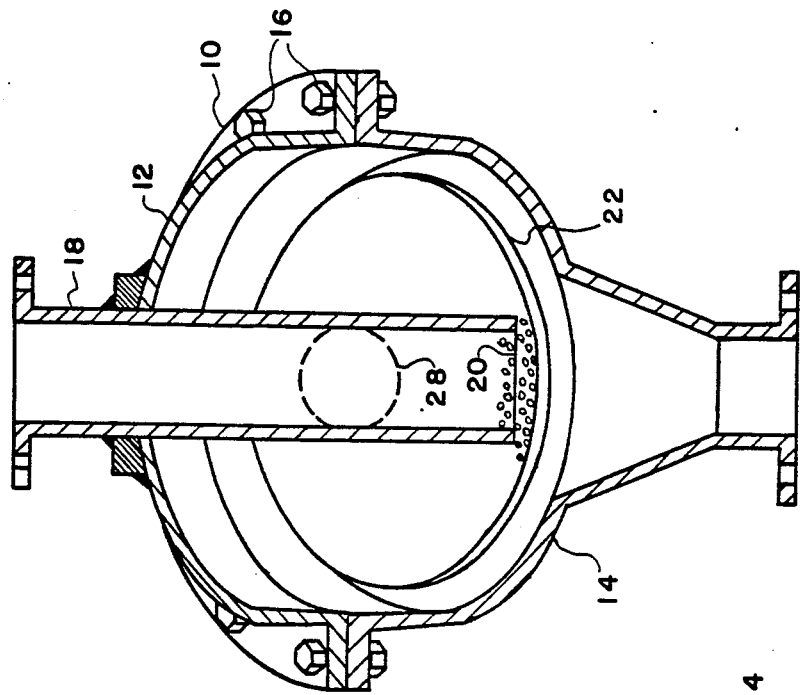
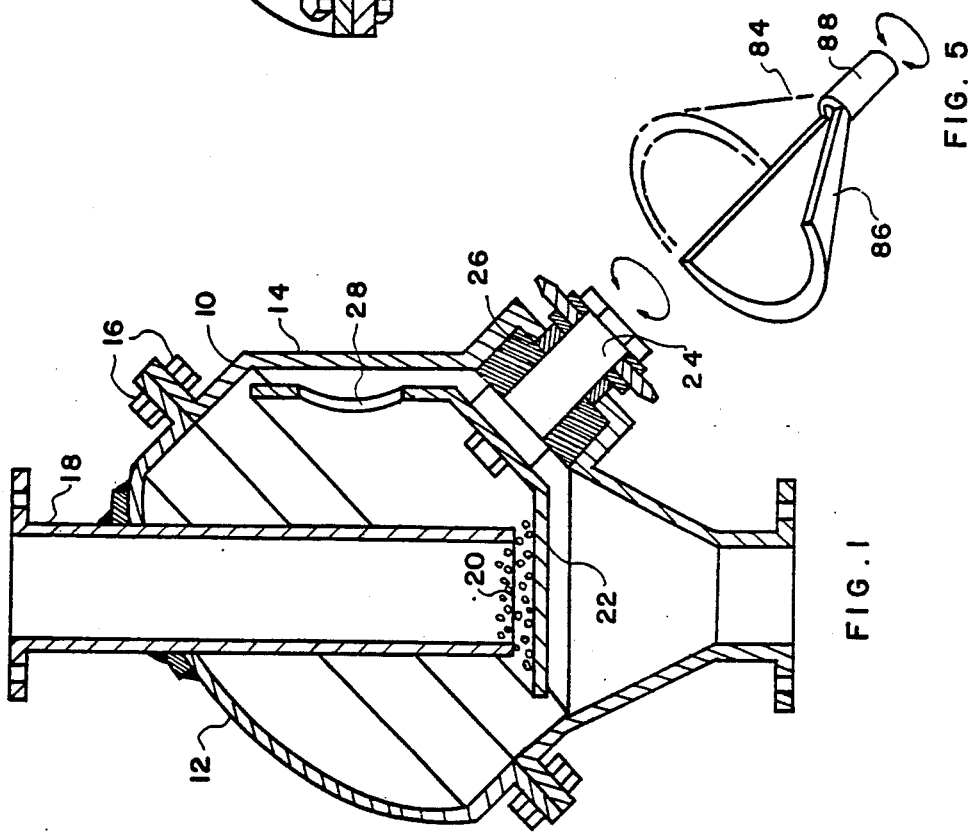

PARTICULATE SOLIDS FLOW CONTROL VALVE

This invention relates to the control of the gravity flow of granular or other particulate solid materials and more particularly to a novel valve structure for such applications. While the valve of the present invention can be used to control the flow of a wide variety of particulate materials, it is especially useful in handling relatively friable granular materials at a substantially elevated temperature, e.g. particulate sponge iron as produced in a gaseous reduction reactor for the direct reduction of iron ore.

The flow control of friable granular materials at temperatures of, for example, 500° C. or more involves a number of special problems. Many of the prior art flow control valves such as gate and ball valves, have relatively movable flow controlling parts that are or may be closely spaced, and the granules of a friable material tend to get caught between these parts and crushed as the valves are closed. Thus, in valves that are to be used in controlling the flow of friable granules, the flow-controlling members should desirably have clearances that are somewhat greater than the diameter of the granules whose flow is to be controlled.

In cases where the valve is to be used to control the flow of hot granular materials, the valve parts, particularly the movable valve members, must be so mounted and of such a configuration that they will tolerate a large variation in temperature without binding or significant deformation due to thermal distortion. Also the flow passages of the valve when open should be free from internal obstructions that might impede the free flow of the granular material therethrough. In valves for high temperature applications, excessive distortion can sometimes be avoided only by water-cooling a part or parts of the valve and the valve must be so constructed as to permit such cooling.

It is accordingly an object of the present invention to provide an improved control valve for controlling the gravity flow of granular materials.

It is another object of the invention to provide a novel valve for controlling the flow of a friable granular material while minimizing crushing of the particles of the material as the valve is operated.

It is still another object of the invention to provide a novel valve for controlling the flow of hot granular material and that has improved resistance to thermal distortion.

Other objects of the invention will be in part obvious and in part pointed out hereafter.

SUMMARY OF THE INVENTION

The objects and advantages of the invention are achieved in general by providing a valve having an essentially vertical feed tube and a cantilever-mounted concavo-convex, i.e. dished, flow-controlling valve member rotatable about an axis forming an obtuse angle with the central axis of the feed tube and having its concave surface confronting the lower end of the feed tube but spaced therefrom. When the valve is in its closed position, the concave surface of the flow-controlling member is spaced from the lower end of the feed tube an amount somewhat greater than the typical maximum diameter of the particles of the material whose flow is to be controlled, but by virtue of its concavity it blocks the flow of particulate material from the feed tube and causes it to assume its angle of repose in the area between the feed tube and the rotatable valve member. The concavo-convex valve member has one or more openings therein that, by rotation of the valve member, can be brought into registry with the feed tube to permit flow of particulate material through the valve.

BRIEF DESCRIPTION OF THE DRAWINGS

The objects and advantages of the invention can best be understood and appreciated by reference to the accompanying drawings which illustrate valves for controlling the flow of a particulate material incorporating a preferred embodiment and several modifications of the invention and wherein:

FIG. 1 is a vertical axial section through the valve, feed tube and cantilever-mounted flow-controlling valve member and shows a valve member having a conical flow-controlling surface;

FIG. 2 is a vertical axial section taken along the line 2—2 of FIG. 1 and showing further details of the valve;

FIG. 5 is a fragmentary perspective of an alternative configuration of flow-controlling member wherein the control member is a segment of a cone.

DESCRIPTION OF A PREFERRED EMBODIMENT

Figure 3:
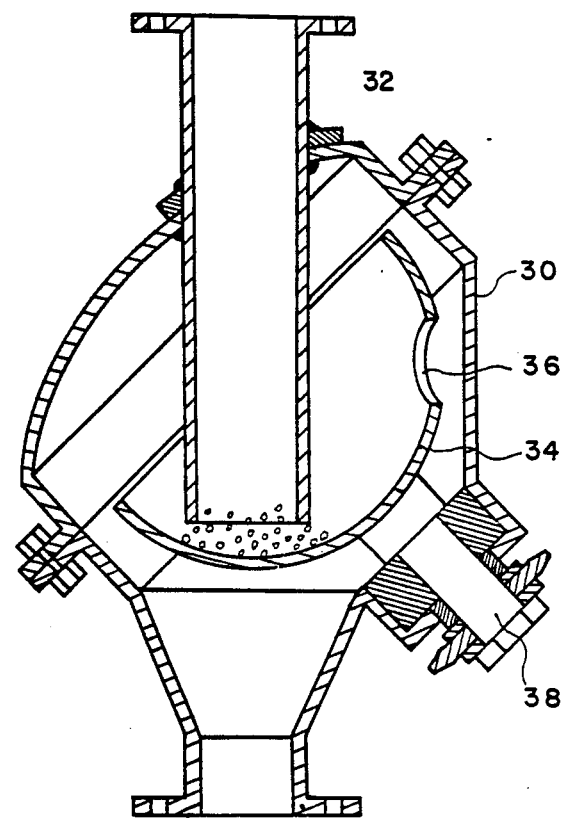
FIG. 3 is a vertical axial section through a valve generally similar to that of FIG. 1 but wherein the rotatable valve member is a section of a sphere.

Referring to the drawings and particularly to FIGS. 1 and 2, the valve there shown comprises a casing 10 having an upper section 12 and lower section 14 bolted together by the bolts 16. Mounted in the upper section 12 and extending downwardly into the casing 10 there is a feed tube 18 having a discharge end 20 confronting and essentially perpendicular to the inner surface of a frusto-conical valve member 22. With the valve in its closed position as shown in FIGS. 1 and 2, valve member 22 blocks the flow of granular material from the discharge end 20 of the feed tube 18, and the material between discharge end 20 and control member 22 assumes its normal angle of repose.

Although for purposes of illustration the feed tube is shown empty of particles, except for at the discharge end 20; it will be understood that the tube 20 may typically be entirely filled with particles.

The valve member 22 is cantilever-mounted on the upper end of a shaft 24 that is rotatable in a journal bearing 26 secured in the lower section 14 of casing 10. The axis of rotation of shaft 24 forms an obtuse angle with the central vertical axis of feed tube 18. Member 22 is provided with an opening 28 that is positioned, when the valve member is rotated by shaft 24, to register with the discharge end 20 of feed tube 18 and thereby open the valve to permit gravity flow of the granular material through the valve. Rotation of shaft 24 can be effected manually or by suitable automatic means. It is evident that two or more openings such as the opening 28 may be provided in the conical valve member 22 if convenient or desired.

Turning now to FIG. 3 of the drawings, the valve there shown is generally similar to that of FIGS. 1 and 2. It comprises a casing 30 into which a feed pipe 32 extends downwardly. A concavo-convex valve member 34 confronts the lower end of feed tube 32 and when the valve is closed, blocks flow of granular material from the feed tube. The valve member 34 has an opening 36 therein and is cantilever-mounted on a rotatable shaft 38 by means of which it may be rotated to bring opening 36 into registry with feed tube 32 and thus open the valve. The valve of FIG. 3 differs from that of FIGS. 1 and 2 in that its valve member 34 is hemispherical rather than conical.

Figure 4:
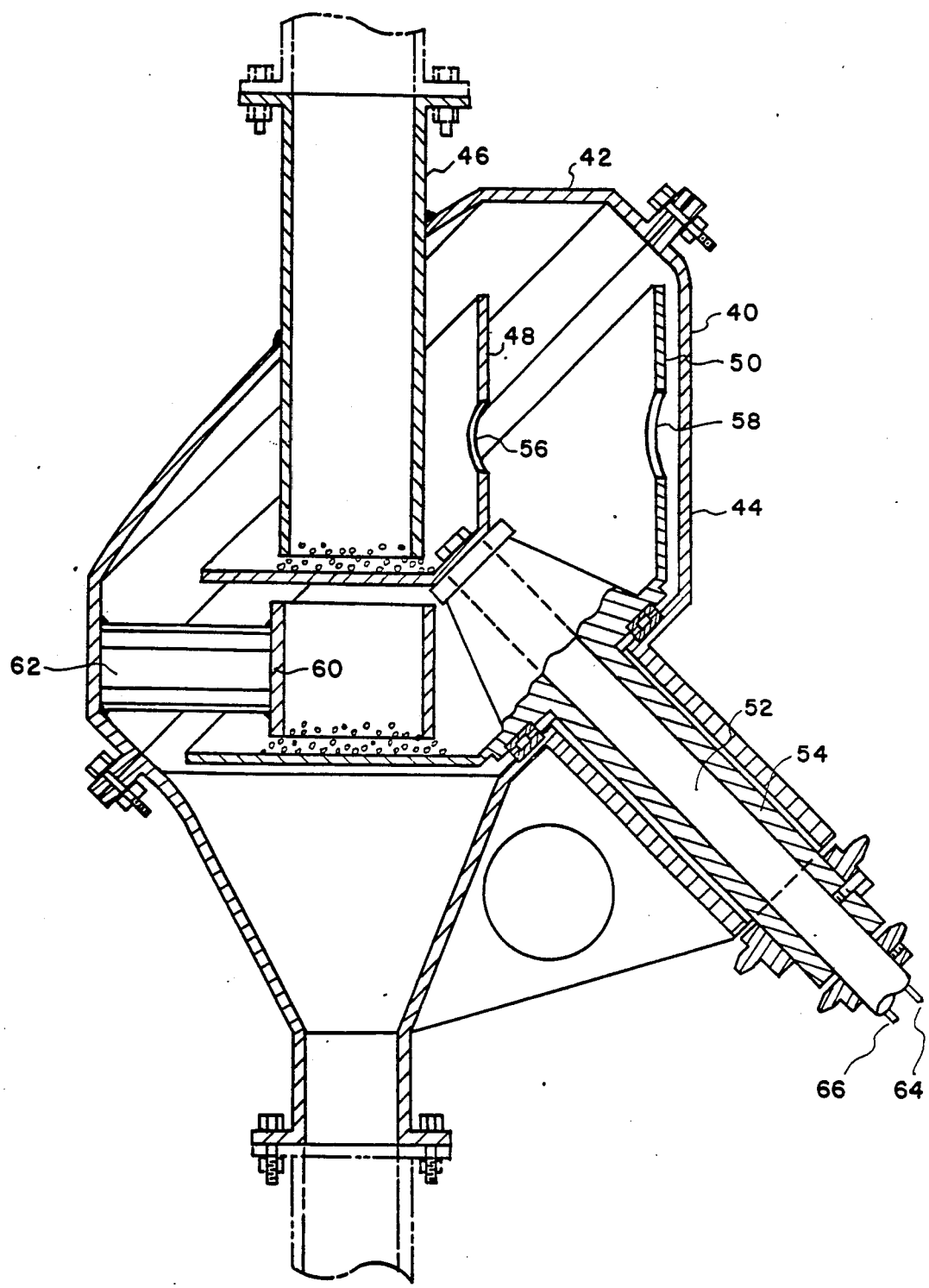
FIG. 4 is a vertical axial section through a valve having two independently rotatable conical flow-controlling members. As described below, the conical members are spaced apart a predetermined distance to provide for the feeding of successive measured amounts of the particulate material through the valve.

Referring next to FIG. 4 of the drawings, the valve there shown might be characterized as a dosing valve in that it provides for the delivery of discrete predetermined measured amounts of the granular material. It has a casing 40 with upper and lower sections 42 and 44 and a feed tube 46 mounted in the upper section 42 and extending downwardly therein. Regulation of the flow of granular material through the valve is achieved by means of a pair of spaced conical valve members 48 and 50 cantilever-mounted on the coaxial and independently rotatable shafts 52 and 54, respectively. Valve member 48 contains an opening 56 which can be positioned in registry with feed tube 46 by rotation of shaft 52 and valve member 48. In like manner, valve member 50 has an opening 58 therein that can be positioned in registry with feed tube 46 by rotation of shaft 54 and valve member 50.

Positioned between the valve members 48 and 50 and aligned with feed tube 46 there is a metering cylinder 60 secured to and supported by a bracket 62 that is in turn attached to the wall of upper section 42 of casing 40. In the operation of the valve, shaft 52 is rotated to align opening 56 with the bottom of feed tube 46 and permit granular material to flow into metering cylinder 60. When the metering cylinder has been filled, valve member 48 is rotated to its closed position blocking the lower end of feed tube 46. Thereafter shaft 54 and valve member 50 are rotated to align opening 58 with the metering cylinder 60 and permit the measured amount of granular material to be discharged from the valve.

Preferably, the metering cylinder 60 is sufficiently larger in diameter than the opening 56 in the valve member 48 so that the particles will not overflow the top of cylinder 60. This is accomplished by the angle of repose of the particles from the opening 56 when positioned below the feed tube 46, intersecting the cylinder 60 below its top.

As indicated in FIG. 4, the coaxial shafts 52 and 54 and valve members 48 and 50 can be cooled by passing a coolant through shaft 52. Thus, a coolant, e.g. water, can be supplied to shaft 52 through pipe 64 and withdrawn from the shaft through pipe 66.

FIG. 4 also illustrates the fact that, if desired, the values of the invention can be provided with a pair of spaced rotatable flow-controlling members mounted for rotation by two shafts making equal or different obtuse angles with respect to the vertical axis of the feed tube and located in different planes.

FIG. 5 illustrates the fact that the conical valve members of FIGS. 1, 3 and 4 need not be complete cones with one or more openings therein. Thus, the valve member 84 of FIG. 6 comprises a conical segment 86 mounted on an actuating shaft 88. Valve member 84 is adapted to be mounted in a valve casing like that of FIG. 1 with the segment 86 blocking the discharge of material from the feed tube 18. The valve can be opened by rotating shaft 88 to move conical segment 84 away from the bottom of the feed tube. It is evident that the hemispherical valve member 34 of FIG. 3 may similarly be replaced by a valve member that is a spherical segment, if desired.

From the foregoing description it should be evident that valves incorporating the present invention are capable of providing the several advantages outlined above. The concavo-convex valve member is arranged with its dished interior surface confronting the lower end of the feed tube but spaced therefrom and hence blocks the flow of granular material from the feed tube without crushing it when the valve is closed. The cantilever mounting of the movable valve member on a shaft that extends through the casing permits substantial thermal expansion of the valve member without binding. Since the actuating shaft is arranged at an obtuse angle with respect to the axis of the feed tube and is located in the lower part of the valve casing, it is completely out of the flow path of the granular material. When the valve is in its open position, there is a straight and completely unobstructed flow path for the granular material to flow through the valve. Also the invention provides a simple, efficient and compact valve structure.

It is, of course, to be understood that the embodiments of the invention described above are intended to be illustrative and it will be evident to those skilled in the art that numerous changes can be made in the illustrative embodiments described without departing from the scope of the invention.

What is claimed is:

1. A device for regulating the flow of a particulate solid material comprising, in combination, a valve casing, a feed pipe extending into said casing and having an essentially vertical axis, at least one concavo-convex valve member mounted in said casing for rotation about an axis forming an obtuse angle with the axis of said feed pipe, a rotatable valve actuating shaft secured to said valve member and extending downwardly through the wall of said casing, said valve member being positioned with a portion of its concave surface confronting the lower end of said feed pipe and essentially perpendicular to the axis of said feed pipe, said valve member having at least one opening positionable to register with the lower end of said feed pipe and means for rotating said shaft and valve member to selectively permit or prevent flow of said material through the opening in said valve member, said valve member being spaced from the bottom of said feed tube to minimize crushing of said particulate material as said valve member is moved with respect to said feed tube.

2. A device according to claim 1 wherein the flow controlling surface of said valve member is conical.

3. A device according to claim 1 wherein the flow-controlling surface of said valve member is a section of a spherical surface.

4. A device according to claim 1 wherein the flow-controlling surface of said valve member is a segment of a cone.

5. A device according to claim 1 wherein said valve member has more than one opening registrable with the lower end of said feed tube.

6. A device according to claim 1 wherein said actuating shaft is water-cooled.

7. A device according to claim 1 comprising two spaced concavo-convex valve members rotatably mounted in said casing and having concave flow-controlling surfaces essentially perpendicular to the axis of said feed pipe.

8. A device according to claim 7 wherein both valve members are mounted on respective coaxial actuating shafts extending through the wall of said casing.

9. A device according to claim 7 further comprising a discharge pipe positioned below said feed pipe to receive particles passed through the holes of said valve members, and a valve seat means for engaging the lower of said valve members and forming an essentially gas-tight seal therewith to isolate the interior of said casing from said discharge pipe.

* * * * *